United States Patent [19]
Sakurai et al.

[11] Patent Number: 5,223,948
[45] Date of Patent: Jun. 29, 1993

[54] IMAGE PROCESSING APPARATUS

[75] Inventors: Shigeo Sakurai; Eiichi Tanabe; Naoji Tsutsumi, Kanagawa, all of Japan

[73] Assignee: Fuji Xerox Co., Ltd., Tokyo, Japan

[21] Appl. No.: 594,968

[22] Filed: Oct. 10, 1990

[51] Int. Cl.$^5$ ............................................. H04N 1/40
[52] U.S. Cl. ................... 358/404; 358/444; 358/449
[58] Field of Search ............. 358/404, 406, 401, 449, 358/451, 444

[56] References Cited

U.S. PATENT DOCUMENTS 5,016,114  5/1991  Sakata et al. ..................... 358/404

*Primary Examiner*—Edward L. Coles, Sr.
*Assistant Examiner*—Thomas D. Lee

*Attorney, Agent, or Firm*—Finnegan, Henderson, Farabow, Garrett & Dunner

[57] ABSTRACT

An image processing apparatus and corresponding methods which include a means for determining whether image information of documents read by an image reader can be entirely stored in a storage device prior to performing image processing. The apparatus comprises, in part, an arithmetic operation component which calculates the number of sheets of the documents, (the image information of which are supplied through an image input device such as a scanner so as to be stored in a compressed state) corresponding to the residual storage capacity of a storage device. The apparatus also includes a display device for displaying the number calculated by the arithmetic operation component.

3 Claims, 12 Drawing Sheets

IMAGE PROCESSING APPARATUS

BACKGROUND OF THE INVENTION

1. Field of the Invention

The present invention relates to an image processing apparatus used in an image recording apparatus, for example, a digital copy machine, a facsimile machine, or a printer, in which image information based on documents is stored before being recorded by reading the stored image information.

2. Discussion of the Related Art

Recently, with the spread of personal computers and word processors, etc., the image information to be copied or similarly processed has become diverse and large in quantity.

To cope with this growth in image information processing with respect to copy machines for generating copies of documents, it is a matter of course that technical improvements are always needed to improve the production of quality copied images. Further, technical improvements are required to provide not only functions for producing quality copies of a document on a desired number of sheets and production of copies of a document with a desired scale of reduction/enlargement, but also other related copy functions.

Examples of various functions which have been required in copy machines include an electronic recirculating document handler (or "electronic RDH") function in which a plurality of input documents are copied on a desired number of sheets for every input document. Also, this electronic RDH function allows for copying input documents onto a suitable assortment of sheets. Another copy machine function is called the bookbinding function in which, for example, images of a plurality of documents are suitably edited and copied in a manner so that images of two documents are copied on each of opposite surfaces of each sheet of recording paper so as to divide each surface into two pages, all the sheets of recording paper on which images of all the documents have been copied are stacked, and then the stack of sheets of recording paper are bound at the center and doubled into one booklet in which the copies of the documents are arranged in the order of the input documents, and so on.

Other examples of functions which have been required in copy machines include an image communication function as a facsimile device, a function as a printer for outputting information from, for example, a host computer or a personal computer.

Conventionally, copy machines in which these functions can be incorporated have been referred to as digital copy machines. That is, in a digital copy machine, documents are set in an automatic document feeder (or "ADF"), and the documents are automatically successively fed by the ADF onto a platen of the copy machine so that the image on each document is read by a scanner and stored in a storage device after it is once converted into an electric signal. This type of digital copy machine, uses an image processing apparatus as described below. In this image processing apparatus, image information of the document read in by means of a scanner is compressed by a compressor so as to be stored in a storage device in a compressed state in order to make it possible to store a larger quantity of image information in the storage device.

A digital copy machine of the type shown in FIG. 11 has a copy function connected to a scanning function such as scanner 100, an image communication function such as a facsimile device (not shown), and a printing function such as a printer (not shown) for outputting information of, for example, a host computer or personal computer (not shown). Therefore, image information of input documents from the scanner 100, image information from the facsimile device input through a telephone line (not shown) and image information from the host or personal computer can be parallelly input into the image processing apparatus 110 through an input interface 107 and a multiplexer 108. For purposes of this example, only scanner 100 is shown in FIG. 11.

To further explain the processes of the image processing apparatus 110 shown in FIG. 11, the apparatus 110 has a configuration where the image information of an input document is read in by a scanner 100. After being compressed by a compressor 101, the image information read in by the scanner 100 is then stored in a storage device 103, for example, a hard disk, via a page memory 102. Then, the image information stored in the storage device 103 is read through the page memory 102 and expanded by an expander 104. Next, the expanded image information is subjected to secondary processing, if necessary, in an image output terminal (or "IOT") 105 which records and outputs the expanded image information.

Similarly, the image information input from a facsimile device through the multiplexer 108 and input interface 107 or the image information input from the host or personal computer is also compressed by the compressor 101 and then stored in the storage device 103 through the page memory 102. Parallel operations of reading the information stored in the storage device 103 and recording it through the IOT 105 can be carried out simultaneously.

In FIG. 11 the reference numeral 106 designates a CPU for controlling the scanner 100 or other input device, the compressor 101, the page memory 102, and the storage device 103.

The following describes an example of the electronic RDH function in which a desired number of copies are made for each of a plurality of input documents while maintaining the original order of the input documents. First, a plurality of documents are set in the ADF. The documents are successively automatically conveyed onto the platen of the copy machine by the ADF, so that the image of each document can be scanned by the scanner 100. Next, the image information of the document generated by the scanner 100 is compressed by the compressor 101 and stored in the storage device 103 through the page memory 102. Thus, an ordered a series of image information corresponding to the input documents stored in the storage device 103 is successively read out and recorded by the IOT 105, thereby producing the electronic RDH function in which a desired number of ordered copies are made for each of a plurality of input documents while maintaining the original order of the input documents.

As described above, the image processing apparatus 110 is designed so that the image information of each document scanned by the scanner 100 is compressed by the compressor 101 and then stored in the storage device 103. Accordingly, it is a matter of course that the storage capacity of the storage device 103 has a predetermined limitation. Therefore, the image processing apparatus is arranged to tell the residual capacity of the storage device 103 to the operator by means of indicating the residual capacity of the storage device 103 on the display unit of a user interface (hereinafter called "UI") as, for example, "Remaining  Mbytes" or as "Remaining  %".

However, this conventional technique has several problems. As described above, the image processing apparatus is arranged to tell the residual capacity of the storage device 103 to the operator by means for indicating the residual capacity of the storage device 103 as "Remaining  Mbytes" or as "Remaining  %". Although an operator can be notified that the residual capacity of the storage device is " Mbytes" or " %", there arises a problem in that a determination as to the residual capacity of the storage device 103 with respect to whether all documents to be subjected to the electronic RDH function can be read in the storage device 103 cannot be made.

Accordingly, when the residual capacity of the storage device 103 becomes zero while a series of documents are read in the storage device from the scanner 100, the images of the documents cannot be stored in the storage device any more. If the document reading operation is continued, the image information of the documents suffer a deficit. Accordingly, the document reading operation of the scanner 100 must be interrupted before the residual capacity of the storage device 103 will be recovered sufficiently. Further, the operation of resetting the documents in the ADF and reading the documents are required for restarting the document reading operation. There arises therefore a problem in that the document reading operation becomes complex and troublesome.

SUMMARY OF THE INVENTION

The present invention has been made in view of the above circumstances and has an object to provide an image processing apparatus in which interruption of document reading operation or the like can be prevented by an early determination as to whether image information of documents read by an image reader can be entirely stored in a storage device.

Additional objects and advantages of the invention will be set forth in part in the description which follows and in part will be obvious from the description, of may be learned by practice of the invention. The objects and advantages of the invention may be realized an attained by means of the instrumentalities and combinations particularly pointed out in the appended claims.

To achieve the above object and in accordance with the purpose of the invention, as embodied and broadly described herein, according to an aspect of the present invention, the image processing apparatus comprises:

An image processing apparatus capable of processing documents of at least one page which documents are supplied to an image reading means, comprising:

an image input means for supplying image information of documents read through the image reading means;

a compression means for compressing the image information supplied through said image reading means;

a storage means for storing said image information compressed by said compression means;

a residual storage capacity detecting means for detecting the residual storage capacity of said storage means;

an arithmetic operation means for calculating the number of pages of the documents, the image information of which are supplied through said image input means so as to be stored in a compressed state, corresponding to the residual storage capacity of said storage means detected by said residual storage capacity detecting means; and a display means for displaying the number calculated by said arithmetic operation means.

In the aforementioned image processing apparatus, the arithmetic operation means may use a predetermined document compression ratio when it calculates the number of sheets of the input documents. The image information of the input documents is supplied through the image input means so as to be stored in a compressed state, corresponding to the residual storage capacity of the storage means detected by the residual storage capacity detecting means. However, the invention is not limited to the specific embodiment. For example, in the aforementioned image processing apparatus, the arithmetic operation means may detect a document compression ratio and may use the document compression ratio when it calculates the number of sheets of the documents, the image information of which are supplied through the image input means so as to be stored in a compressed state, corresponding to the residual storage capacity of the storage means detected by the residual storage capacity detecting means.

In addition, in the image processing apparatus, the document compression ratio may be calculated on the basis of the number of documents, the size thereof and the quantity of image information thereof detected by using an automatic document feeder.

According to the present invention, the residual capacity of the storage means is detected by the residual storage capacity detecting means. Then, the number of sheets of the documents, the image information of which are supplied through the image input means to be stored in a compressed state, corresponding to the residual storage capacity of the storage means detected by the residual storage capacity detecting means is calculated by the arithmetic operation means, so that the number of sheets of the residual documents the image information can be stored can be displayed on the display means. Accordingly, the operator can judge by seeing the display means whether or not the image information of the documents read by the image reading means can be entirely stored in the storage means.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings.

DESCRIPTION OF THE PREFERRED IMPLEMENTATION

The preferred implementation of the present invention will now be described with reference to the accompanying drawings.

Figure 1:
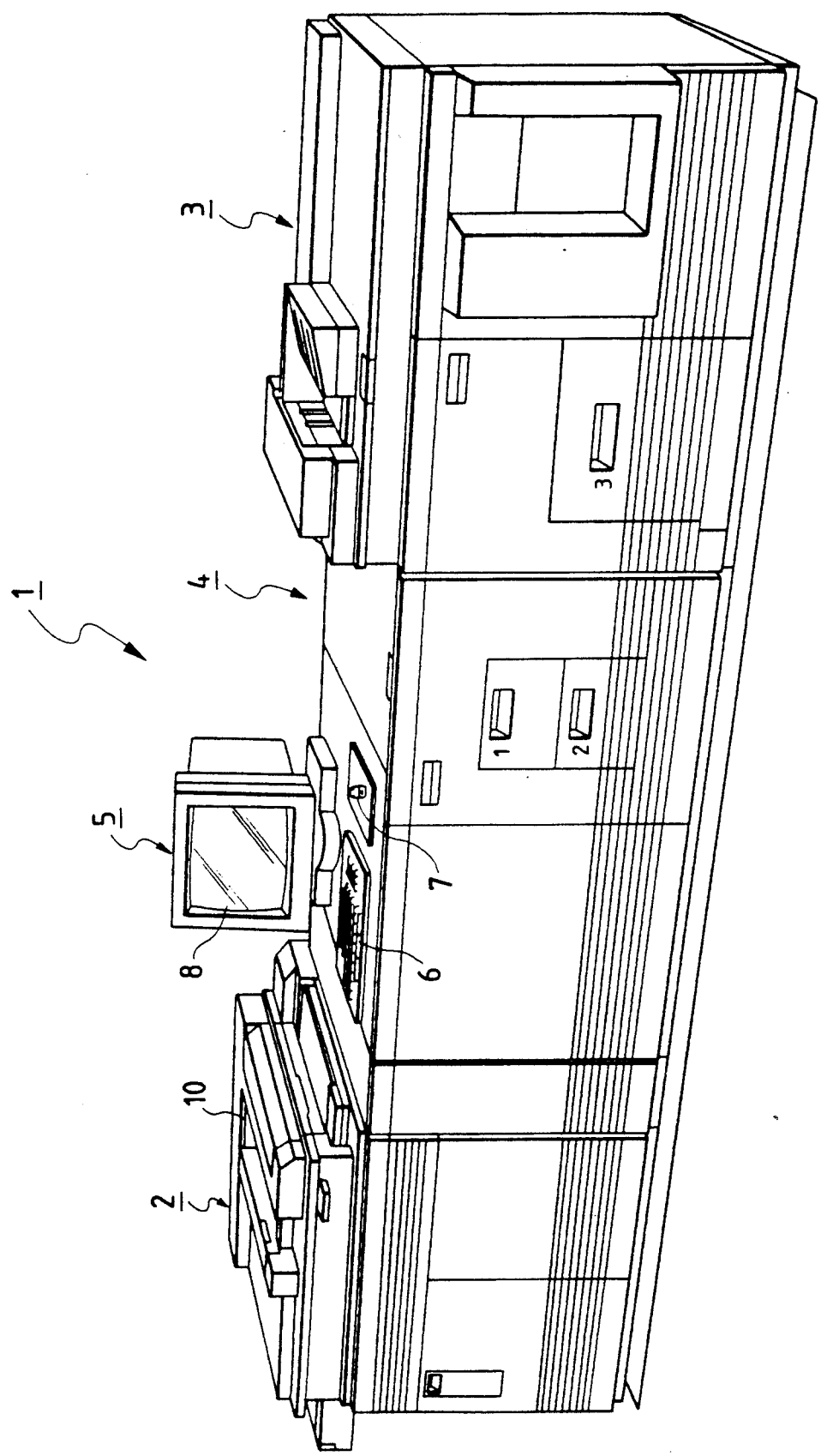
FIG. 1 is a perspective view showing the external appearance of a digital copy machine which may include the image processing apparatus according to the present invention.

FIG. 1 is a perspective view showing the external appearance of a digital copy machine 1 which may include the image processing apparatus according to the present invention.

The digital copy machine 1 has, in addition to an ordinary function for making copies of documents and a function for performing copying on opposite surfaces and multiple copying on one-side surface, an RDH function in which a plurality of input documents are copied on a desired number of sheets for every input document. Also, this RDH function allows for copying input documents onto a suitable assortment of sheets. Further, digital copy machine 1 includes a bookbinding function in which images of a plurality of documents are suitably edited and copied in a manner so that images of two documents are copied on each of opposite surfaces of each sheet of recording paper so as to divide each surface into two pages, all the sheets of recording paper on which images of all the documents have been copied are stacked, and then the stack of sheets of recording paper are bound at the center and doubled into one booklet in which the copies of the documents are arranged in the order of pages.

Further, the digital copy machine 1 has an image communication function as a facsimile device, a function as a printer for outputting information from a host computer or a personal computer in addition to the copying function described above.

Generally, the digital copy machine 1 includes an image input terminal (or "IIT") 2, an image output terminal (or "IOT") 3, and a controller (or "CONT") 4 for controlling the operation of the IIT 2 and IOT 3. The IIT 2 is arranged to read an image of a document, convert the read image into an electronic signal, and output the electronic signal after performing some fundamental processing, for example, zigzag correction processing, of the electronic signal. The IOT 3 is arranged to store the image information supplied from the IIT 2, to record the image information after performing requested secondary processing, and to output the image information.

The CONT 4 has a user interface (or "UI") 5 through which an operator can designate a copying operation. Specifically, UI 5 is provided with a keyboard 6 and a mouse 7 through which an operator can designate a copying operation and a display 8 for displaying the contents of the copying operation designated by the operator.

In this example, the IIT 2 includes an automatic document feeder (or "ADF") 10 for automatically feeding a document onto a platen of the IIT 2. The ADF 10 is incorporated in a cover unit which may cover the top of the platen of the IIT 2 body as shown in FIG. 1.

Figure 2:
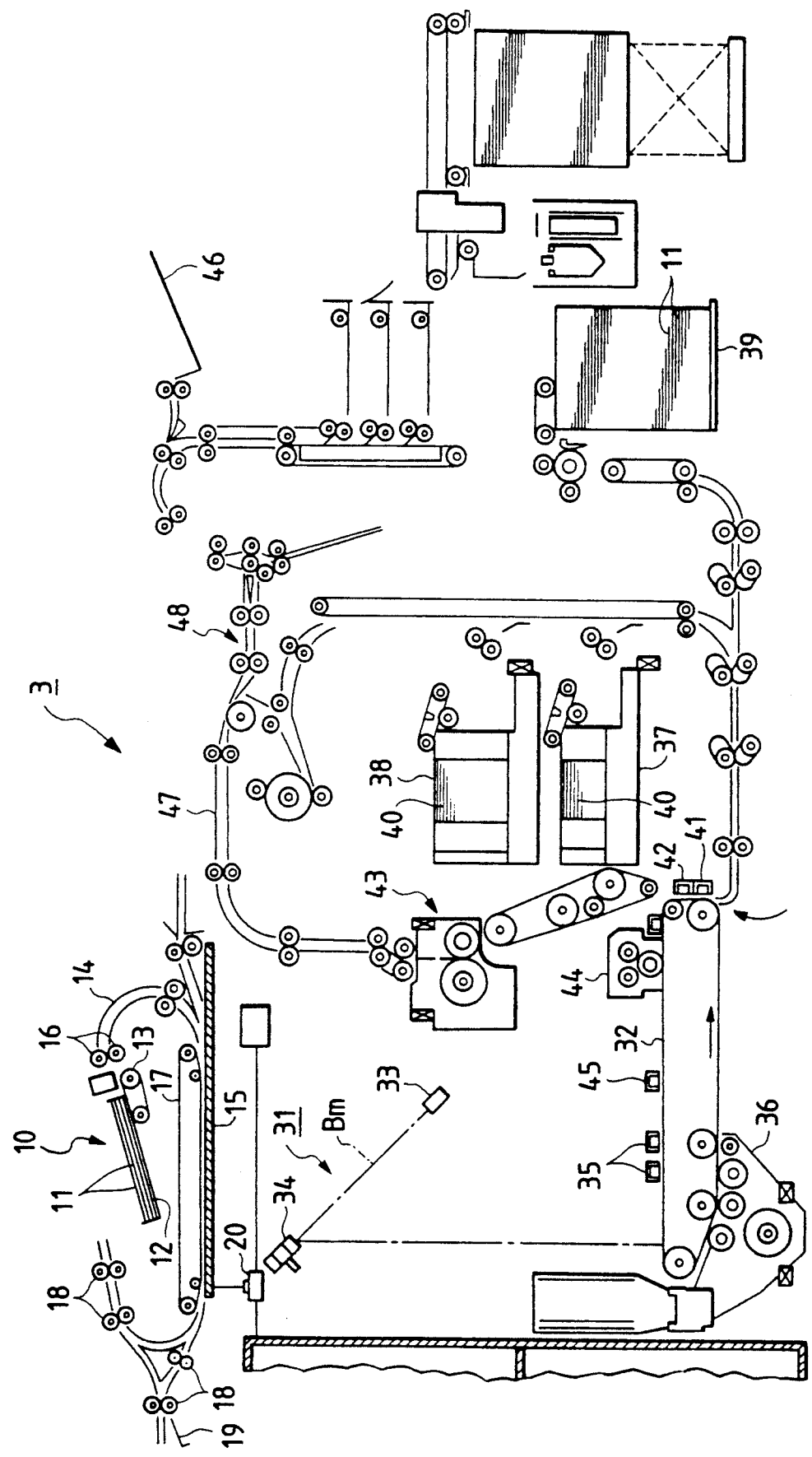
FIG. 2 is a view showing the configuration of the image recording portion of the above digital copy machine.

As shown in FIG. 2, the ADF 10 includes a document feed tray 12 for accommodating a large number of documents 11 therein, a feed belt 13 for feeding, one by one, the documents 11 held by the document feed tray 12, conveyor rollers 16 for conveying the document 11, which is fed by the feed belt 13, to the platen 15 through a paper shoot 14, a conveyor belt 17 for conveying the document, which is conveyed by the conveyor rollers 16, to a document setting position on the platen 15, discharging conveyor rollers 18 for discharging the document 11 sent out by the conveyor belt 17 upon the completion of reading the image of the document 11 mounted on the platen 15, and a document receiving tray 19 for accommodating the discharged document 11.

Figure 3:
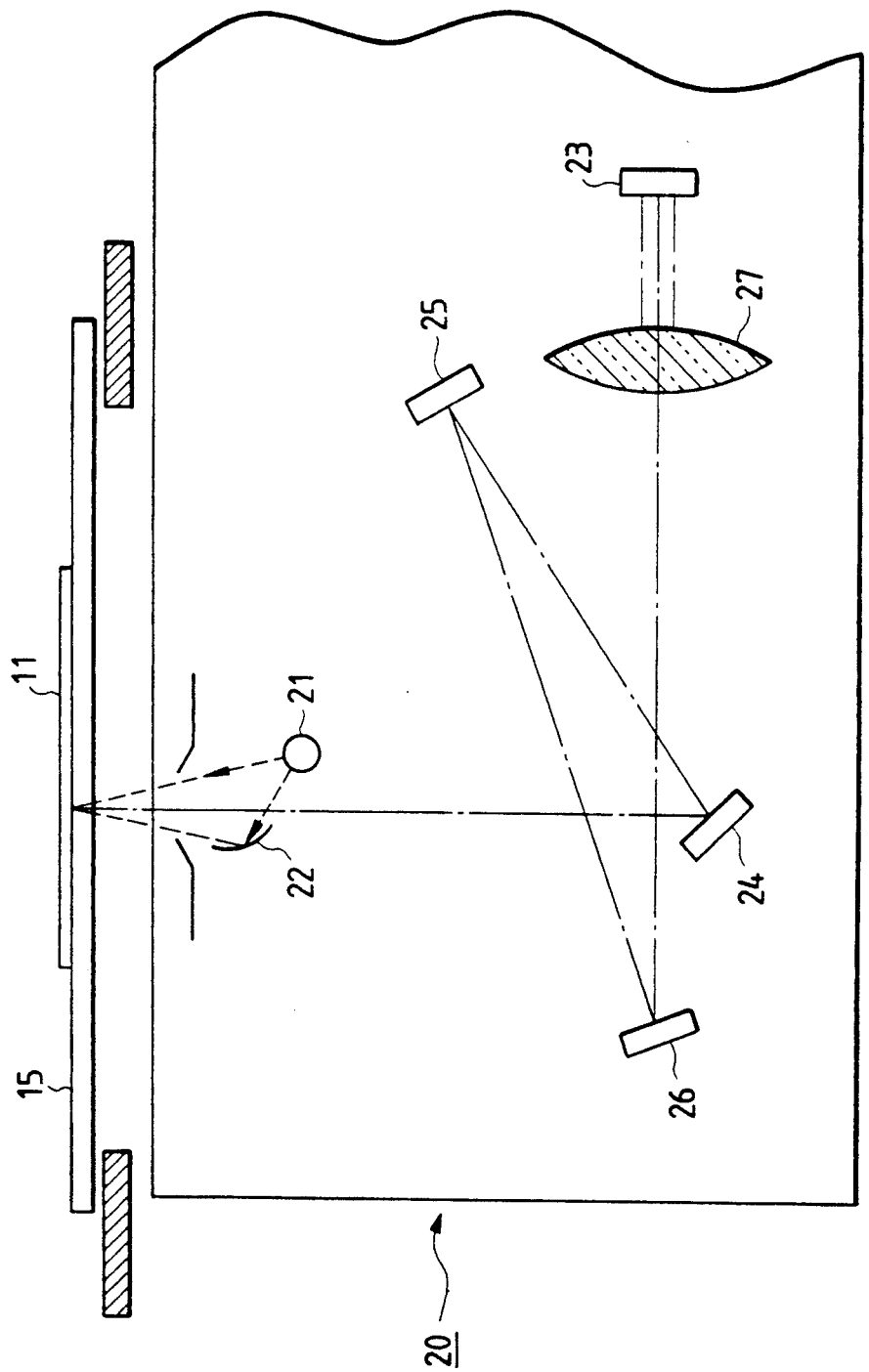
FIG. 3 is a view showing the configuration of a scanner.

The document 11 fed onto the platen 15 of the IIT body by the ADF 10 is read by a scanner 20 of the IIT 2 as shown in FIG. 3. The scanner 20 is provided with a light source 21 for lighting the document 11 mounted on the platen 15, a reflection plate 22 for reflecting light from the light source 21 toward the document 11, a plurality of mirrors 24, 25, and 26 for leading the reflected light from the document 11 to an image sensor array 23 constituted by CCDs or the like, and a lens 27 for focusing the image carrying light led by the mirrors 24, 25, and 26 onto the image sensor array 23. The light source 21, the mirrors 24, 25, and 26, the image sensor array 23, and the like are integrally assembled as the scanner 20 as shown in FIG. 2. The scanner 20 is driven by a drive mechanism (not shown) so as to be reciprocatable below the platen 15 in the sub-scanning direction. Further, the scanner 20 is arranged so as to read the image of the document 11 mounted on the platen 15 by means of the image sensor array 23 while moving below the platen 15 in the subscanning direction.

Figure 4:
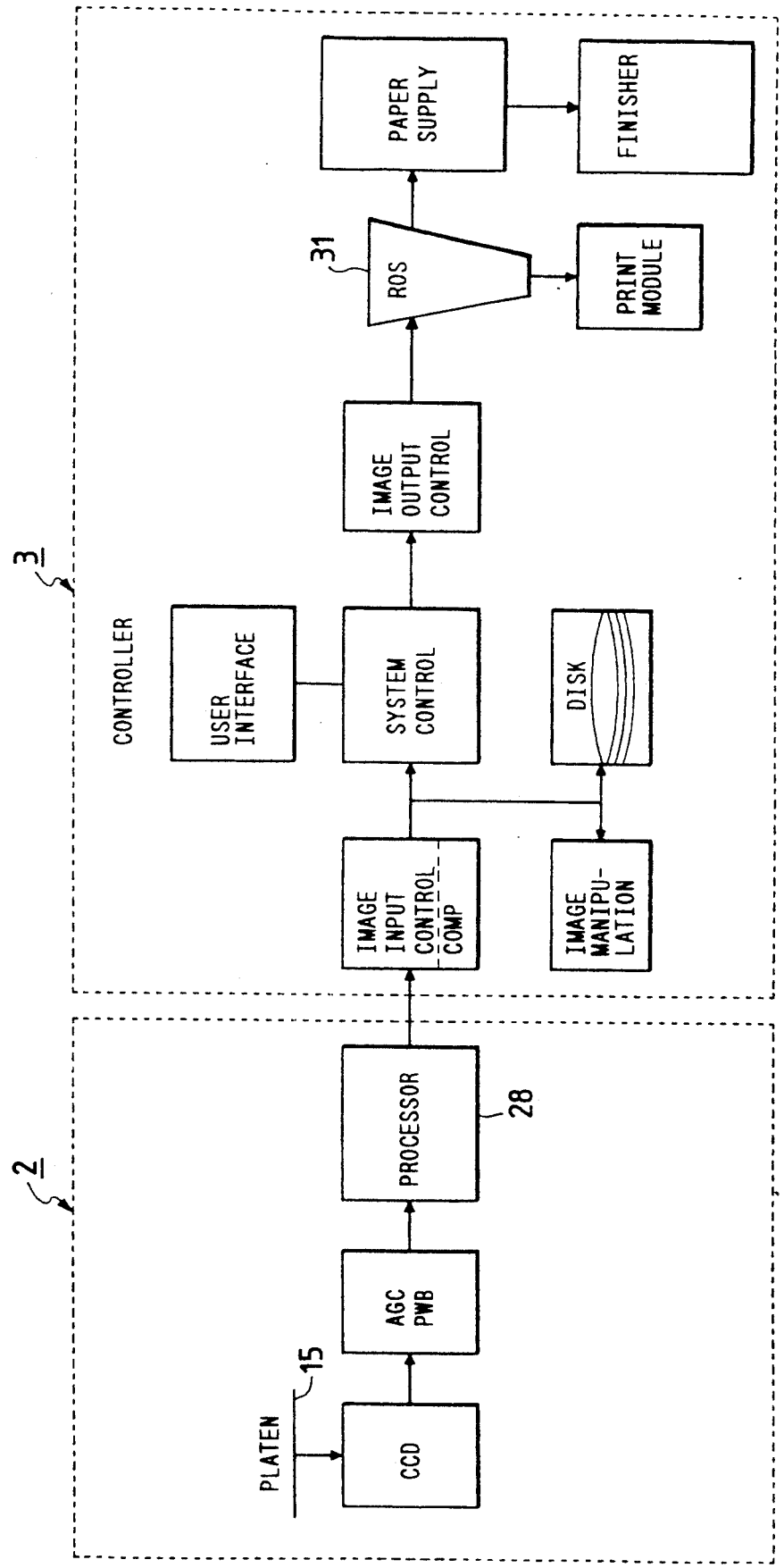
FIG. 4 is a block diagram showing the configuration of the IIT and the IOT.

The image information of the document 11 read by the image sensor array 23 of the scanner 20 is supplied to a processor 28 (FIG. 4) which performs some fundamental processing, for example, zigzag correction processing, and then supplied to the IOT 3, as shown in FIG. 4.

As will be described later, the image information received by the IOT 3 will be compressed and stored by the image processing apparatus according to the present invention. The image information read out from the image processing apparatus is converted into an optical signal by a raster output scanner (or "ROS") unit 31 and supplied to a photoreceptor belt 32 which is subjected to scanning exposure, as shown in FIG. 4.

The ROS unit 31 includes a semiconductor laser 33 and a polygon mirror 34, as shown in FIG. 2, so that a beam ("BM") from the semiconductor laser 33 is reflected by reflective surfaces of the polygon mirror 34 so that the reflected image is projected onto the photoreceptor belt 32 over a predetermined scanning range.

The ROS unit 31 is arranged so that a laser beam Bm emitted from the semiconductor laser 33, which oscillates in accordance with image information, is scanned by the polygon mirror 34 in the axial direction of the photoreceptor belt 32 so that an image corresponding to the image information is transferred onto the photoreceptor belt 32 through scanning exposure.

After the photoreceptor belt 32 is uniformly electrically charged in advance by primary chargers 35 so as to have a predetermined electrical potential, an image is applied onto the photoreceptor belt 32 by means of the ROS unit 31 through scanning exposure as described above, so that an electrostatic latent image is formed on the surface of the photoreceptor belt 32.

The electrostatic latent image is developed to form a toner image by using black toner by a developing device 36. Then, the toner image formed on the photoreceptor belt 32 is transferred, by electrification of a transfer charger 41, from the photoreceptor belt 32 onto recording paper 40 of a predetermined size supplied from one of a plurality of paper supply cassettes 37 and 38, provided in the IOT 3 body. The recording paper 40 on which the toner image has been transferred is separated from the photoreceptor belt 32 by electrification by means of a separation charger 42, and conveyed to a fusing device (not shown) so that the toner image is fused and fixed on the recording paper 40.

After the completion of the transfer step, the surface of the photoreceptor belt 32 is cleaned by a cleaner 44 so that residual toner, paper powder, and the like are removed, and the surface of the photoreceptor belt 32 is electrified by a static eliminator 45 so that residual charge thereon is eliminated. Thus, the photoreceptor belt 32 is prepared for the next image recording process.

The recording paper 40 on which the toner image has been fused, as described above, is discharged as it is onto a discharge ray 46 in the case of a normal copy mode. However, in the case of a double-sided copy mode, a one-sided multiple copy mode, or other similar processing mode, the recording paper 40 on which the toner image has been fused is not discharged, but it is conveyed to the transfer section again through a conveyor path 47 and a paper turn-over mechanism 48 in the state where the recording paper 40 is left as it is or the front and rear surfaces of the recording paper 40 are turned over, so that a predetermined toner image is transferred and fused. After repetition of such transferring and fusing of predetermined images, the recording paper 40 is discharged for the first time onto the discharge tray 46.

Figure 5:
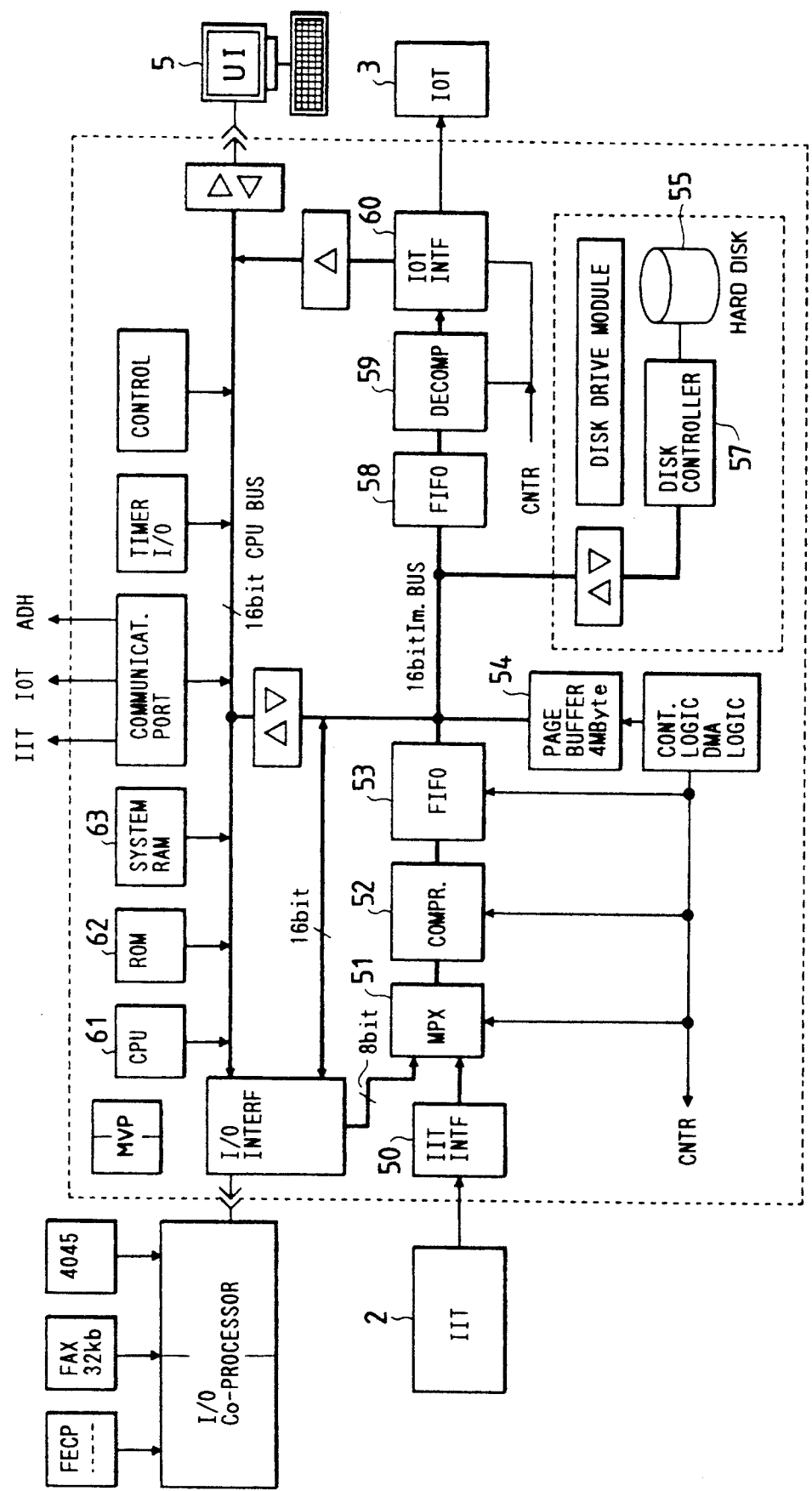
FIG. 5 is a block diagram illustrating an example of an image processing apparatus according to the present invention.

FIG. 5 is a block diagram showing a configuration of a digital copy machine which may incorporate an implementation of the image processing apparatus according to the present invention.

In FIG. 5, the reference numeral 50 designates an input interface for inputting image information obtained from the scanner 20 of the IIT 2 (FIG. 2) or for inputting image information obtained from some facsimile equipment or a personal computer. Multiplexer (or "MPX") 51 selects image information obtained from the scanner 20 of the IIT 2 or selects image information obtained from the facsimile device or the personal computer. The MPX 51 selects image information obtained from the scanner 20 for reading an image, the facsimile equipment or the personal computer by means of sharing time to carry out a parallel (multiplex) image information selecting process.

As shown in FIG. 5, compressor 52 is provided for compressing the image information received from the MPX 51; rate control first-in first-out (FIFO) buffer 53 is provided for controlling the transfer rate of the image information compressed by the compressor 52; and page buffer 54 is provided for temporarily storing the image information received through the rate control buffer 53 and simultaneously stored in storage device 55 which may be a hard disk. As stated, storage device 55 stores the image information received from the page buffer 54. Also provided is a disk controller 57 for controlling the storing operation of the storage device 55.

The reference numeral 58 depicts a second rate control first-in first-out (FIFO) buffer for controlling the transfer rate of the image information read from the storage device 55, 59 depicts an expander for expanding the compressed image information stored in the storage device 55 to the original image information, 60 depicts an output interface for outputting the image information expanded by the expander 59, and 3 depicts the IOT, described above, for receiving the image information from the output interface 60, carrying out a secondary processing for the image information if necessary, and recording the image information prior to completing image information processing.

The reference numeral 61 designates a central processing unit ("CPU") for controlling the operations of the MPX 51, the input interface 50, the compressor 52, the rate control buffer 3, the page buffer 54, the rate control buffer 58, the expander 59, the output interface 60, the IOT 3, etc.

The reference numeral 62 designates a read only memory (or "ROM") having programs stored therein for controlling the CPU 61, and other components of the image processing apparatus, and 63 designates the system RAM for temporarily storing data necessary for image processing.

Image processing in the image copying operation of the image processing apparatus used in the digital copy machine as related to this implementation will now be described with reference to FIG. 6. When, for example, documents are to be copied by using the digital copy machine, the operator sets the documents 11 onto the document feed tray 12, designates a copy mode through the keyboard 6 of the UI 5 and pushes a start button to start the operation of the copy machine.

In the case where the size and number of sheets of the documents 11 to be copied are determined preliminarily, the operator designates the size and number of sheets of the documents 11 through the keyboard 6.

Figure 6:
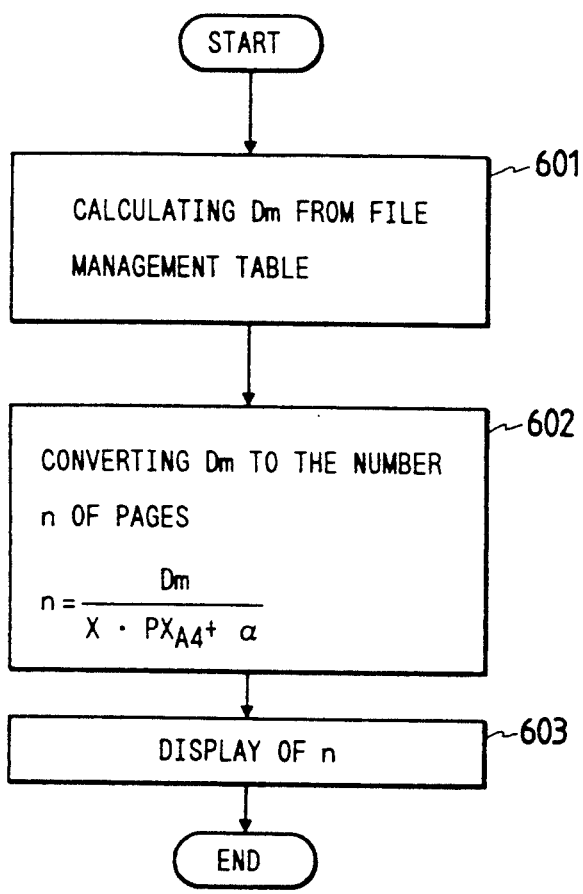
FIG. 6 is a flow chart illustrating the steps of an implementation of the image processing apparatus according to the present invention.

Before the document reading operation, the CPU 61 calculates the residual storage capacity Dm of the storage device 55 by reference to a file management table of the storage device 55 as shown in FIG. 6 (Step 601).

Then, the CPU 61 reads the number of dots in one-page's image information in the size of the documents 11 to be copied (for example, one-page's dot number $PX_{A4}$ being automatically calculated from the size A4 of the documents 11 and the resolution of the scanner 20) and the standard compression ratio X of the image information of the documents 11 in the compressor 52, from the ROM 62 and the RAM 63 and calculates the number, n, of pages (in the documents 11 to be copied) corresponding to the residual capacity of the storage device 55 on the basis of the following formula.

$$n = Dm / (X \cdot PX_{A4} + \alpha)$$

In the formula, $\alpha$ represents a margin required for securing the storage capacity for the documents 11 to be read practically. In short, the capacity for storing the documents 11 can be secured by the margin $\alpha$ even though the compression ratio of the documents 11 is more or less lower than the standard compression ratio. The margin $\alpha$ as well as the standard compression ratio X is preliminarily written in the ROM 62.

When the CPU 61 calculates the number, n, of sheets of documents 11 the image information of which can be stored in the storage device 55, on the basis of the residual capacity Dm of the storage device 55, the number, n, is displayed on the display 8 of the UI 5.

Accordingly, the operator can determine, by comparing the number, n, of sheets of documents 11, the image information which can be stored, displayed on the display 8 of the UI 5 with the number of sheets documents 11 to be copied by eyes, whether the image information of all the documents 11 can be read into the storage device perfectly.

Accordingly, when the number, n, of sheets of documents 11 displayed on the display 8 of the UI 5 is larger than the number of sheets of documents to be copied, the operator can start the operation to read the documents 11 in the ADF 10.

On the contrary, when the number, n, of sheets of documents 11 displayed on the display 8 of the UI 5 is smaller than the number of sheets of documents to be copied, it is impossible to store the image information of all the documents 11 into the storage device 55. If the operation of reading the documents 11 is started, the image information of the documents read in the storage device suffers a deficit. In this case, the operator pushes a stop button to interrupt the document reading operation and waits until the number, n, of sheets of documents 11, the image information of which can be stored, displayed on the display 8 of the UI 5 becomes larger than the number of documents 11 to be copied. At the point in time when the number, n, of sheets of documents 11 the image information of which can be stored is displayed on the display 8 of the UI 5 becomes larger than the number of sheets of the documents to be copied, the operator pushes the start button to re-start the operation to read the documents 11.

As described above, the residual capacity of the storage device 55 is detected by the CPU 61 and, at the same time, the number of sheets of documents 11 the image information of which can be stored in the storage device 55 is calculated on the basis of the residual capacity of the storage device 55 by the CPU 61 with respect to the image information of the documents 11 input from the scanner 20, compressed and stored in the storage device 55. The number of sheets of documents the image information of which can be stored in the storage device 55, calculated by the CPU 61, is displayed on the display 8 of the UI 5. Accordingly, the operator can judge easily from seeing the display 8 of the UI 5 whether the image information of all the documents 11 can be stored in the storage device perfectly. Consequently, the failure of the document reading operation caused by the shortage of the residual capacity of the storage device 55 can be prevented.

Figure 7:
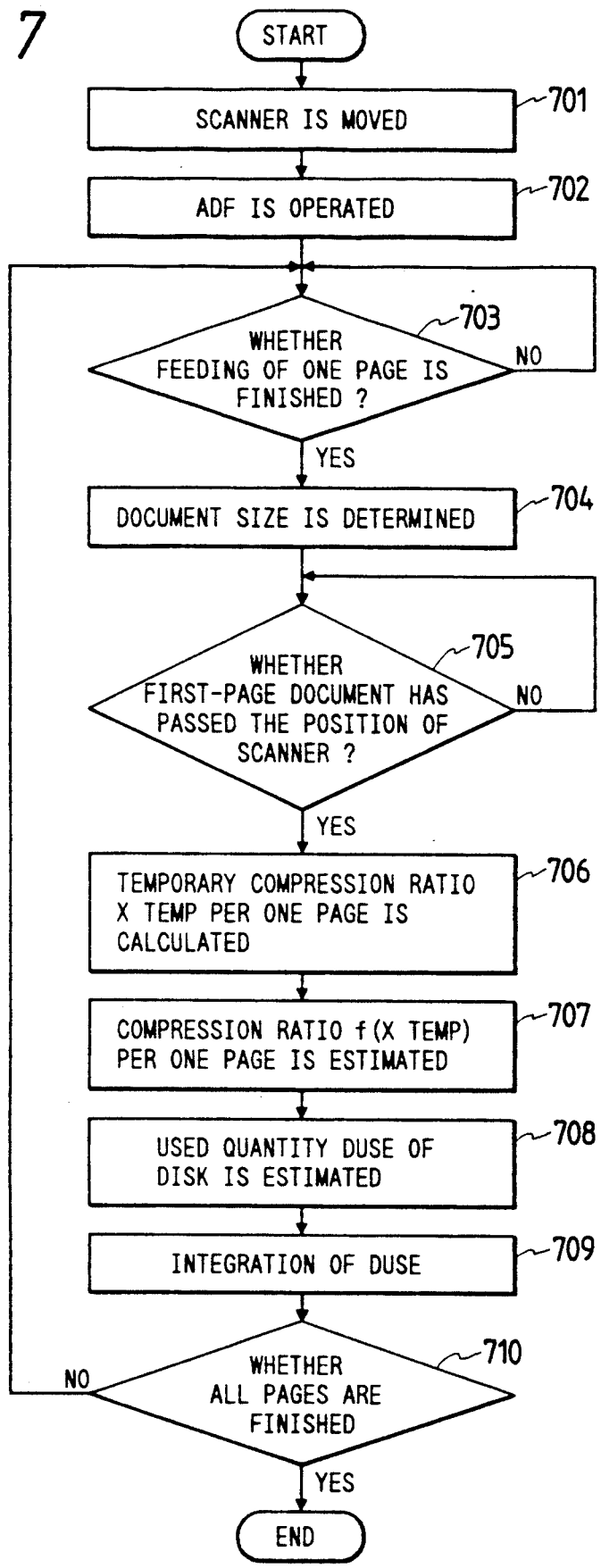
FIGS. 7 through 10 are flow charts illustrating the operation of the image processing apparatus according to other implementations of the present invention.

FIG. 7 shows a configuration employing another implementation of the present invention. In FIG. 7, values designated through the keyboard 6 (FIG. 1) by the operator are not used as the number and size of documents to calculate the compression ratio. Further, in this implementation, values preliminarily stored in the ROM 62 (FIG. 5) are not used to calculate the document compression ratio. In short, in this implementation, the number of documents 11, the size thereof and the document compression ratio are detected automatically as follows.

When, for example, documents are to be copied by using the digital copy machine, the operator sets the documents 11 onto the document feed tray 12 of the ADF 10, designates a copy mode through the keyboard 6 of the UI 5 and pushes a start button to start the operation of the copy machine.

Before the operation of reading the documents 11, the CPU 61 moves the scanner 20 of the IIT 2 to the document 11 reading start position (Step 701) as shown in FIG. 7. Then, the CPU 61 operates the ADF 10 to one-by-one convey the documents 11 from the document feed tray 12 onto the platen 15 and operates the scanner 20 to temporarily read the image information of the documents 11 (Step 702). At this time, there is no necessity that the documents 11 are stopped on the platen 15 of the IIT 2. Accordingly, the ADF 10 successively passes the documents 11 on the scanner 20 to convey the documents 11 to the document catch tray 9.

At the same time, the CPU 61 determines whether ADF 10 has finished feeding all pages of a document. (Step 703). When the feeding of all pages of a document is finished, the CPU 61 checks the size of the documents 11 (Step 704). The process of checking the size of the documents 11 will now be described. The size of the documents 11, that is, the size in a direction perpendicular to the document feeding direction, is checked by an optical sensor provided in the ADF 10. The size in the direction of length of the documents 11, that is, the size in the document feeding direction, is checked by the number, PXall, of dots in the image information of one page of document based on the document 11 temporarily reading rate of the scanner 20. The image information of the documents 11 read by the scanner 20 are temporarily stored in the page buffer 54 through the input interface 50, the MPX 51 and the like (Step 704).

Thereafter, the CPU 61 determines whether the first page of document 11 has passed the position of the scanner 20 (Step 705). When the first page of document 11 has passed the position of the scanner 20, the temporary compression ratio $X_{temp}$ in one-page's document, of the compressor 52 is calculated (Step 706). The temporary compression ratio $X_{temp}$ in one page of document 11 is calculated by dividing the quantity of use of the memory necessary for storing one page of image information in the page buffer 4 by the quantity, PXall, of image information in one page having the document 11 size detected as described above.

Then, the CPU 61 estimates the compression ratio in one page of document 11 based on the temporary compression ratio $X_{temp}$ (Step 707). The compression ratio in all pages of document 11 is estimated by the following formula based on the temporary compression ratio $X_{temp}$ in one-page's document.

$$f(X_{temp}) = \alpha X_{temp}^2 + Y$$

In this formula, $\alpha$, $\beta$ and Y represent constant values determined based on the temporary reading rate of the scanner 20 and the paper feeding rate of the ADF 10.

The CPU 61 calculates, on the basis of the one page of document 11 compression ratio $f(X_{temp})$ thus obtained, the quantity $D_{use}$ of use for the storage device 55 necessary for compressing and storing the image information of the currently read one page of document 11 (Step 708). The quantity $D_{use}$ of use of the storage device 55 is accumulated for each page of documents.

The CPU 61 repeats the aforementioned operation (Step 703 to Step 709) until the temporary reading of all the pages of the documents 11 is finished (Step 710).

As described above, the documents 11 to be copied are temporarily read before the copying operation, to calculate the total quantity $D_{use}$ of use of the storage device 55 necessary for storing the compressed image information of the documents 11.

The CPU 61 determines whether the image information of all the documents 11 to be copied can be read into the storage device by comparing the residual capacity $D_m$ of the storage device 55 with the total quantity of use of the storage device 65 in the same manner as in the first embodiment. The result is displayed on the display 8 of the UI 5.

Accordingly, the operator can determine, by the output on the display 8 of the UI 5, whether the image information of all the documents 11 can be read into the storage device 55 perfectly. Accordingly, when "STORE-ENABLE" is displayed on the display 8 of the UI 5, the operator can start the operation of reading the documents 11.

Although the operation of reading the documents 11 of the ADF 10 can he started when a determination is made that the operation of reading the documents 11 can be started, the operation of reading the documents 11 may be interrupted to give priority to the operation of recording images input from some facsimile device or the like if such image information is input after the starting of the operation of reading the documents 11.

To prevent the interruption of the operation of reading the documents 11 caused by the inputting of the image information from the facsimile device, the total quantity $D_{use}$ of use of the storage device 55 necessary for storing the image information of all the documents 11, which is obtained by the arithmetic operation of the CPU 61, may be secured in the storage device 55 in advance of when a determination is made that the operation of reading the documents 11 of the ADF 10 can be started.

The securing of the total quantity of use of the storage device 55 necessary for storing the compressed image information of all the documents 11 is carried out by writing ID information of a job to be currently executed in the disk management table of the storage device 55.

On the contrary, when "STORE-DISABLE" is displayed on the display 8 of the UI 5, it is impossible to store the image information of all the documents 11 in the storage device 55. If the operation of reading the documents 11 is started, the image information of the documents 11 is incorrect. In this case, the operator pushes a stop button to interrupt the operation of reading the documents 11 and waits until "STORE-ENABLE" is displayed on the display 8 of the UI 5. When "STORE-ENABLE" is displayed on the display 8 of the UI 5, the operator pushes the start button to re-start the operation of reading the documents 11.

Figure 8:
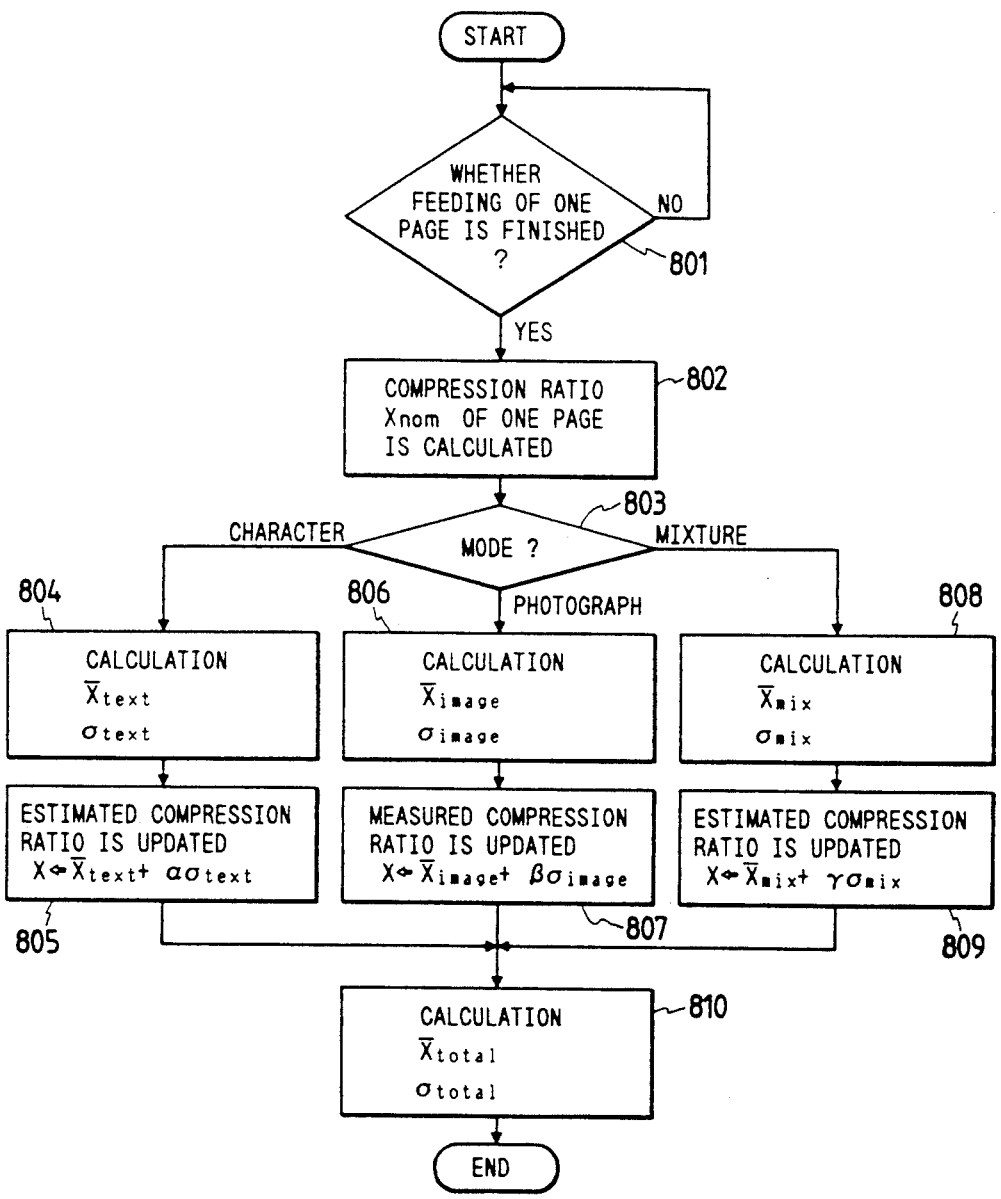

FIG. 8 illustrates a configuration for another implementation of the present invention. In the third implementation, a predetermined operation is carried out based on detecting the number of documents, the size thereof and the document compression ratio and, at the same time, the document compression ratio thus detected is learned so successively that the compression ratio of a document of high frequency in use can be obtained statistically.

When, for example, documents are to be copied by using the digital copy machine, the operator sets the documents 11 onto the document feed tray 12 of the ADF 10, designates a copy mode through the keyboard 6 of the UI 5 and pushes a start button to start the operation of the copying machine.

Similarly to the second implementation, the CPU 61 moves the scanner 20 of the IIT 2 to the document 11 reading start position. Then, the CPU 61 operates the ADF 10 to convey one-by-one the documents 11 from the document feed tray 12 onto the platen 15 and operates the scanner 20 to temporarily read the image information of the documents 11.

At the same time, the CPU 61 judges whether or not the feeding of one page of a document is finished (Step 801). When the feeding of the one page of a document is finished, the CPU 61 calculates the compression ratio $X_{nou}$ of the one page of the read document (Step 802).

Then, the CPU 61 checks the copy mode designated through the keyboard 6 of the UI 5 by the operator (Step 803). When a character mode is designated by the operator, the CPU 61 calculates the average value $X_{text}$ of one page of compression ratios $X_{nou}$ and the standard deviation $\delta_{text}$ (Step 804). At the same time, the CPU 61 calculates the estimated compression ratio X of one page of the document on the basis of the formula:

$$X = X_{text} + \alpha\delta_{text}$$

to update the estimated compression ratio X of one page of the document (Step 805). In the formula, $\alpha$ represents a predetermined coefficient.

On the other hand, when a photographic mode is designated by the operator, the CPU 61 calculates the average value $X_{image}$ of one page of compression ratios $X_{nou}$ and the standard deviation $\delta_{image}$ (Step 806). At the same time, the CPU 61 calculates the measured compression ratio X of one-page's document on the basis of the formula:

$$X = X_{image} + \beta\delta_{image}$$

to update the measured compression ratio X of one-page's document (Step 807). In the formula, $\beta$ represents a predetermined coefficient.

When a mixture mode in which character documents and photographic documents are mixed is designated by the operators the CPU 61 calculates the average value $X_{mix}$ of one page of compression ratios $X_{nou}$ and the standard deviation $\delta_{mix}$ (Step 808). At the same time, the CPU 61 calculates the estimated compression ratio X of one page of the document on the basis of the formula:

$$X = X_{mix} + \gamma\delta_{mix}$$

to update the measured compression ratio X of one page of the document (Step 808). In the formula, $\gamma$ represents a predetermined coefficient.

After the compression ratios X in the respective modes are updated as described above, the CPU 61 calculates the average value $X_{total}$ of the one page of compression ratios X in the respective modes and the standard deviation $\delta_{total}$ thereof (Step 810). The average value $X_{total}$ of the one page of compression ratios X in the respective modes and the standard deviation $\delta_{total}$ thereof are stored in the RAM 63.

By the aforementioned procedure, the user can know statistically both the average value $X_{total}$ of the compression ratios X of documents to be subjected to a copying process or the like and the standard deviation $\delta_{total}$ thereof. Accordingly, for example, service engineers can answer the needs of respective users by changing the size of the storage area allocated to the scanner, of the storage device 55 on the basis of the needs that some users are large in the quantity of copies and some users are large in the quantity of communication of images.

Figure 9:
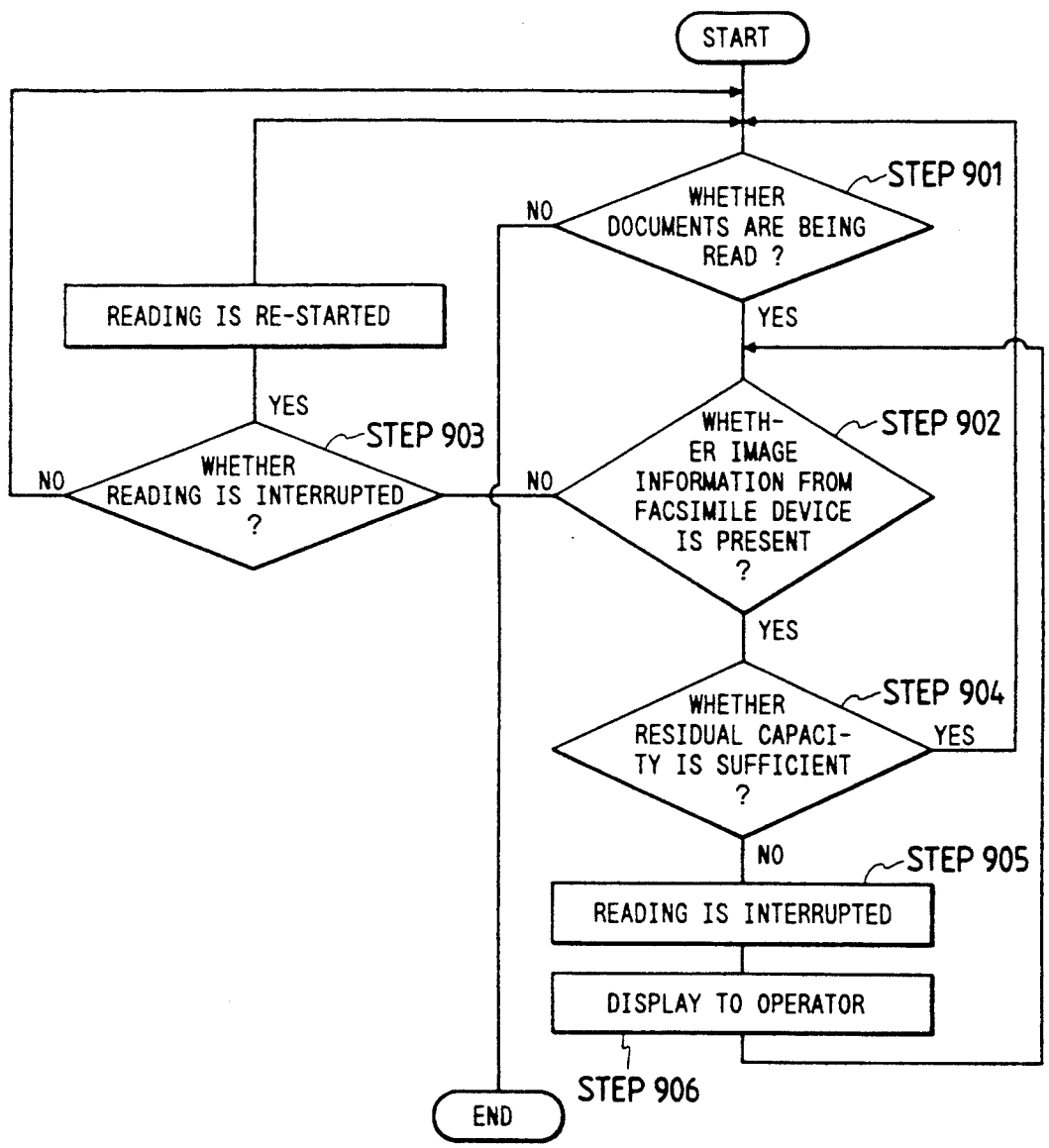

FIG. 9 illustrates another embodiment of the present invention. In this implementation, the machine can solve the problem in the case where image information comes from a facsimile device through a telephone circuit in the period of the document reading operation in the copying process or the like. In general, the image information coming from the facsimile device calls for immediate response. Accordingly, in the case where image information comes from the facsimile device in the period of the document reading operation, priority is given to inputting the image information from the facsimile device. Next to the image information from the facsimile device, priority is given to information input from the host computer. Next, priority is given to image information input from the scanner 20 of the IIT 2.

As shown in FIG. 9, the CPU 61 determines whether the documents 11 are currently being read (Step 901). When the documents 11 are currently being read, the CPU 61 determines whether image information from some facsimile device is present (Step 902). When image information from some facsimile device is absent, the ordinary operation of reading the documents 11 is continued (Step 903).

On the contrary, when image information from some facsimile device is present, the CPU 61 determines whether the residual capacity of the storage device 55 is sufficient (Step 904). When the residual capacity of the storage device 55 is sufficient, the operation of reading the documents 11 is continued (Step 901). When the residual capacity of the storage device 55 is not sufficient, the operation of reading the documents 11 is interrupted (Step 905) and, at the same time, the fact that the residual capacity is not sufficient is displayed on the display 8 of the UI 5 to tell the operator (Step 906).

By the aforementioned procedure, the machine can solve the problem in the case where image information comes from some facsimile device through a telephone line in the period of the operation of reading the documents 11 in the copying processing or the like.

Although this implementation illustrates the case where the operation of reading the documents 11 is interrupted in the presence of image information from some facsimile device, it is not always necessary that the operation of reading the documents 11 must be interrupted when image information from some facsimile device is present.

Figure 10:
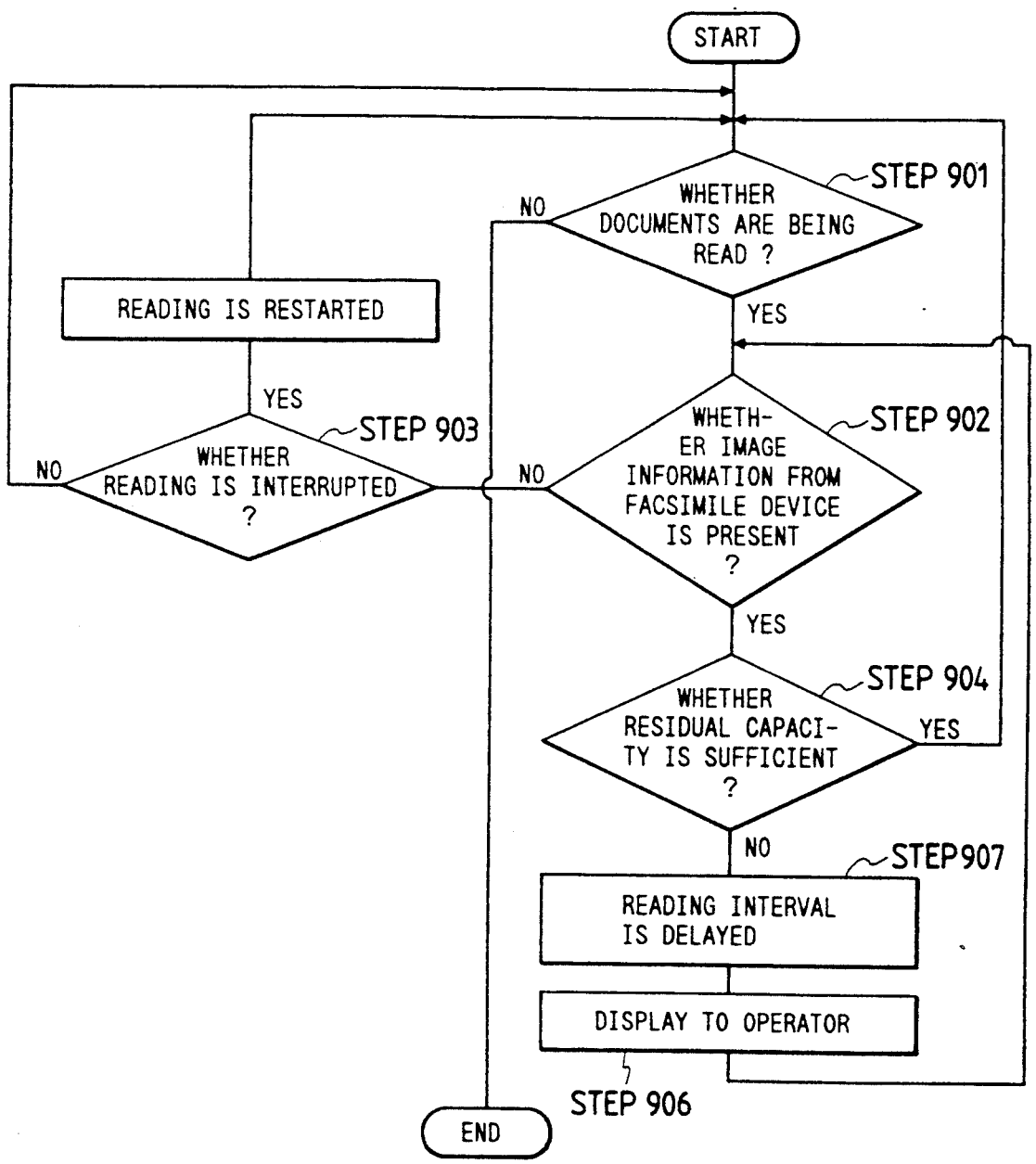
Figure 11:
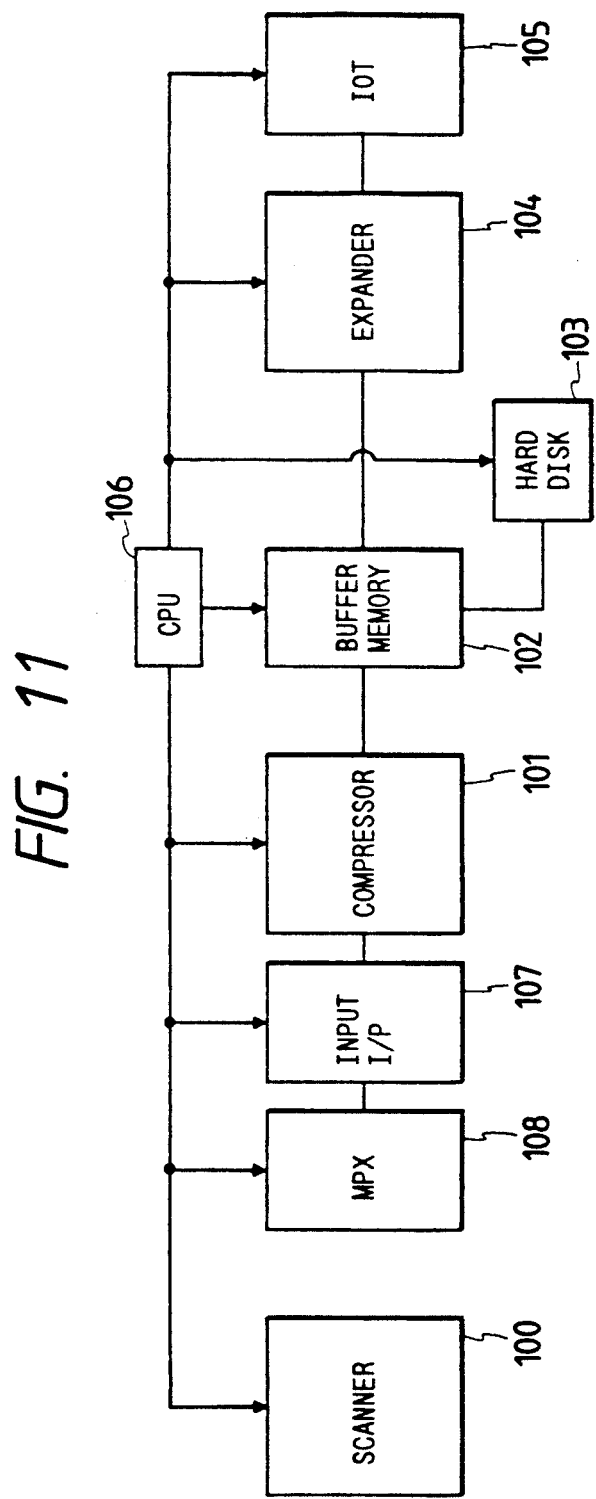
FIG. 11 is a block diagram showing a conventional image processing apparatus.

As shown in FIG. 10, interval time in the operation of reading the documents 11 of the scanner 20 may be delayed (Step 907) in the case where image information from some facsimile device is present. When, for example, the document reading operation is carried out in such a cycle that the time required for scanning one page of document, the time required for inverting the scanner 20 and the time required for scanning next page of document are 1 sec, 0.2 sec and 1 sec, respectively, the stop time of about 0.8 sec may be put between the end of the scanning period of one page of document and the start of the scanning period of next one page of document.

In this case, the interval time (inclusive of the time required for inverting the scanner 20) between the scanning period of one page of document and the scanning period of next one page of document is enlarged from 0.2 sec to 1 sec. Accordingly, image information from some facsimile device can be read from the storage device 55 and recorded by the ROS unit 31 in the interval time of 1 sec between the scanning period of one page of document and the scanning period of next one page of document. Accordingly, the residual capacity corresponding to one page of document is always present in the storage device 55 to make it possible to read the next document 11.

In this case, there is no necessity of interrupting the operation of reading the documents 11 even though image information comes from some facsimile equipment during the operation of reading the documents 11. Accordingly, the operation of restarting the operation of reading the documents 11 of the ADF 10 can be omitted.

However, the operator may believe the machine has failed if the interval time of the operation of reading the documents 11 is delayed with no indication to the operator. Accordingly, it is preferable that the fact is displayed on the display 8 of the UI 5.

Figure 12:
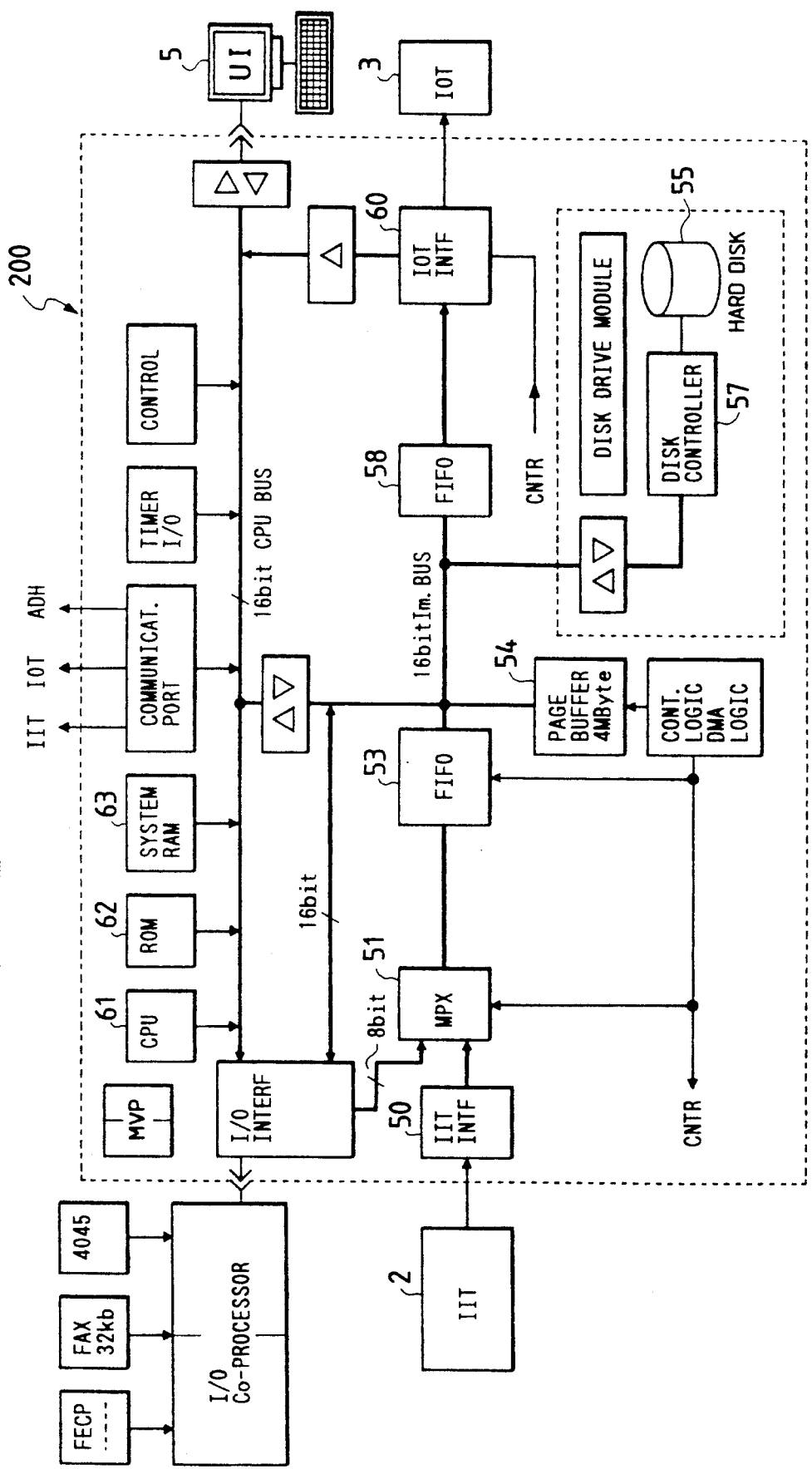
FIG. 12 is a block diagram showing a fifth configuration of the invention.

FIG. 12 illustrates in block diagram form an image processing apparatus 200 in accordance with a fifth configuration of the invention. Apparatus 200 is identical to the image processing apparatus illustrated in FIG. 5 except that apparatus 200 does not perform compression and decompression of image data and therefore does not include compressor 52 and expander 59.

In accordance with the fifth configuration, CPU 61 computes a total data amount that will need to be stored on hard disk 55 for each job supplied by a user via the user interface 5. Thus, based on the job attribute data for each job supplied via the user interface 5, e.g., a number of copies, a size of document and a number document originals, CPU 61 computes the total amount of data for each job. Any additional information required by CPU 61 to compute the total data amount, e.g., an assumed amount of data per page as a function of the size of the document original, is stored in and readable from the ROM 62.

CPU 61 further monitors the amount of data read from the hard disk 55 and transmitted to the image output terminal 3, e.g., a printer. In the case where such outputting fulfills the requirement of a job, the memory space in the hard disk 55 corresponding to the data is available for writing with newly supplied image data. CPU 61 is therefore programmed to compute a residual storage capacity in the hard disk 55 from the total data amount based on the user inputted job attributes and the data transmitted to the image output terminal 3.

CPU 61 is also programed to convert the computed residual storage capacity into a number of sheets of documents for which there is storage space in the hard disk drive 55. To the extent that a computed number of sheets is a function of sheet size, the data stored in ROM 62 is again available for reading by CPU 61 to enable performance of the computation. The appropriate sheet size to be assumed in computing the number of sheets of documents is preferably supplied by the user. Alternatively, a conservative assumption with respect to data per sheet, that is independent of sheet size, can be used as the basis for the computation performed by CPU 61.

CPU 61 is further programmed to cause the display screen of user interface 61 to display to a user the residual storage capacity of the hard disk 55 expressed as a number of sheets. As a result, advantageously, a user is apprised of the amount of space remaining, in terms of the number of document sheets, in memory, that is available for performing additional copying jobs.

In accordance with an alternative form of the fifth configuration, CPU 61 computes the residual storage capacity based on the amount of data that is written into and read from the hard disk 55. Thus, CPU 61 monitors the read and write operations to hard disk 55 and thereby maintains a current computation of the residual storage capacity. CPU is further programmed, as described above, to convert the computed residual storage capacity into a number of sheets of documents and to cause the computed number of document sheets to be displayed on the display of the user interface 5.

As described above, this implementation illustrates the case where priority is given to image information supplied from the facsimile device, information supplied from the host computer and image information supplied from the scanner 20 of the IIT 2 in the order.

However, the invention is not limited to the specific implementation. The order of priority given to jobs may be changed suitably. In this case, the order of priority given to the respective jobs is changed by operating a predetermined keyboard in a service engineer mode (SE mode) at the time of the turning-on of the electric source. For example, priority may be given to image information supplied from the facsimile device, image information supplied from the scanner 20 of the IIT 2 and information supplied from the host computer in the order. This reason is as follows. In general, the frequency in use of information called from the host computer by the user is not high. Further, the information from the host computer is in most cases low in priority. A sufficient quantity of information from the host computer can be, in most cases, recorded in the night in which the document copying process is little made.

The construction and operation of the present invention have been described above. The present invention comprises an image input means for supplying image information of documents read through an image reading means; a compression means for compressing the image information inputted through the image-reading means; a storage means for storing the image information compressed by the compression means; an expansion means for expanding the image information read from the storage means; a residual storage capacity detecting means for detecting the residual storage capacity of the storage means; an arithmetic operation means for calculating the number of sheets of the documents, the image information of which are supplied through the image input means so as to be stored in a compressed state, corresponding to the residual storage capacity of the storage means detected by the residual storage capacity detecting means; and a display means for displaying the number of sheets of residual documents the image of which can be stored in the storage means, calculated by the arithmetic operation means. Accordingly, the invention can provide an image processing apparatus in which a judgment can be made as to whether the image information of documents read by an image reader can be entirely stored in a storage device and in which the interruption of the document reading operation caused by the shortage of the residual capacity of the storage device can be prevented.

The foregoing description of preferred implementations of the invention has been presented for purposes of illustration and description. It is not intended to be exhaustive or to limit the invention to the precise form disclosed, and modifications and variations are possible in light of the above teachings or may be acquired from practice of the invention. The implementations were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image processing apparatus for processing a plurality of documents each of at least one page which documents are supplied to an image reader, comprising:

image input means for supplying image information including a plurality of dots corresponding to the pages of a first document of the plurality of documents read by the image reader;

compression means for compressing the image information input through the image reader;

storage means for storing said image information compressed by said compression means;

residual storage capacity detecting means for detecting a residual storage capacity $Dm$ of said storage means;

arithmetic operation means for calculating a number of the pages $N$ of the first document for which corresponding image information can be stored in the storage means, wherein $$N = Dm / (X * PX + m)$$

and $m$ is a margin required for insuring adequate residual storage capacity in the storage means for the pages of the first document, $PX$ is the number of dots of image information corresponding to one page of the first document and is determined as a function of the size of the pages of the first document, and $X$ is a predetermined standard compression ratio for the image information corresponding to the pages of the first document; and display means for displaying $N$ calculated by said arithmetic operation means.

2. An image processing apparatus capable of processing documents of at least one page which documents are supplied to an image reader, comprising:

image input means for supplying image information including a plurality of dots corresponding to documents read through the image reader;

compression means for compressing the image information input through the image reader;

storage means for storing said image information compressed by said compression means;

residual storage capacity detecting means for detecting, prior to the compression of image information by the compression means, the residual storage capacity of said storage means;

arithmetic operation means for calculating a number of pages of the documents corresponding to the residual storage capacity of said storage means detected by said residual storage capacity detecting means, said arithmetic operation means using a temporary compression ratio calculated by dividing a required capacity of the storage means necessary for storing image information corresponding to one of the pages of one of the documents by a number corresponding to a total number of dots of image information in the storage means corresponding to the documents; and display means for displaying the number calculated by said arithmetic operation means.

3. An image processing apparatus capable of processing documents of at least one page which documents are supplied to an image reader, comprising:

image input means for supplying image information of documents read through the image reader;

compression means for compressing the image information input through the image reader;

storage means for storing said image information compressed by said compression means;

residual storage capacity detecting means for detecting the residual storage capacity of said storage means;

arithmetic operation means for calculating a number of the pages of the documents corresponding to the residual storage capacity of said storage means detected by said residual storage capacity detecting means, said arithmetic operation means using a total compression ratio calculated using an estimated compression ratio for image information corresponding to a first page of the first document, an average compression ratio for a current mode of operation and a standard deviation between the estimated compression ratio and the average compression ratio; and display means for displaying the number calculated by said arithmetic operation means.

* * * * *